United States Patent
Wandelt

(10) Patent No.: US 9,150,145 B2
(45) Date of Patent: Oct. 6, 2015

(54) VEHICLE HEADLIGHT ASSEMBLY WITH SELF-ADJUSTING FASTENERS

(71) Applicant: Dennis Wandelt, Wolfsburg (DE)

(72) Inventor: Dennis Wandelt, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 113 days.

(21) Appl. No.: 14/175,460

(22) Filed: Feb. 7, 2014

(65) Prior Publication Data

US 2015/0224916 A1   Aug. 13, 2015

(51) Int. Cl.
*B60Q 1/068* (2006.01)
*B60Q 1/04* (2006.01)
*F16B 35/04* (2006.01)

(52) U.S. Cl.
CPC ............ *B60Q 1/0683* (2013.01); *B60Q 1/0483* (2013.01); *F16B 35/04* (2013.01)

(58) Field of Classification Search
CPC .. B60Q 1/0683; B60Q 1/0483; B60Q 1/0433; B60Q 1/045; B60Q 1/0408; B60Q 1/06; F16B 35/04; F16B 35/041; F16B 5/04; F16B 5/0233; F16B 5/0225; F16B 5/02
See application file for complete search history.

(56) References Cited

U.S. PATENT DOCUMENTS

| | | | |
|---|---|---|---|
| 3,842,877 A | 10/1974 | Andrews | |
| 4,043,239 A * | 8/1977 | DeFusco | 411/337 |
| 4,333,131 A | 6/1982 | Hujimoto et al. | |
| 4,356,539 A | 10/1982 | Shanks | |
| 4,580,202 A | 4/1986 | Morette | |
| 4,644,447 A | 2/1987 | Stürtz et al. | |
| 4,751,619 A | 6/1988 | Philippe et al. | |
| 4,757,428 A * | 7/1988 | Ryder et al. | 362/549 |
| 4,906,154 A * | 3/1990 | Sheppard | 411/392 |
| 4,947,306 A * | 8/1990 | O'Shaughnessey | 362/421 |
| 4,994,942 A | 2/1991 | Georgeff | |
| 5,010,456 A | 4/1991 | Reichman et al. | |
| 5,060,127 A | 10/1991 | Birt | |
| 5,094,618 A | 3/1992 | Sullivan | |
| 5,122,934 A | 6/1992 | Schmidt | |
| 5,443,526 A | 8/1995 | Hoerner | |
| 5,496,006 A | 3/1996 | Kulka et al. | |
| 5,566,057 A | 10/1996 | Iwami | |
| 5,605,392 A | 2/1997 | Daumueller et al. | |
| 6,131,346 A | 10/2000 | Kordes | |
| 6,158,177 A | 12/2000 | Blöbaum | |
| 6,592,244 B2 * | 7/2003 | Christiansen | 362/528 |

(Continued)

FOREIGN PATENT DOCUMENTS

DE  1867188 U   2/1963
DE  3540724 C1  12/1986

(Continued)

OTHER PUBLICATIONS

Witte Automotive; Effective Tolerance Compensation—More effective with WITOL®; downloaded from http://www.witol.de/downloads-1/prospects-all-languages/prospects-all-languages; Jan. 2, 2014.

*Primary Examiner* — Bao Q Truong

(74) *Attorney, Agent, or Firm* — Barnes & Thornburg LLP

(57) ABSTRACT

A headlight assembly according to the present disclosure includes a brace, a headlamp, and a plurality of self-adjusting fasteners. The self-adjusting fasteners are configured to adjust during mounting of the headlamp to the brace to compensate for irregular spacing between the headlamp and the brace caused by manufacturing variations.

27 Claims, 4 Drawing Sheets

(56) References Cited

U.S. PATENT DOCUMENTS

| | | |
|---|---|---|
| 6,595,964 B2 | 7/2003 | Finley et al. |
| 6,623,203 B2 | 9/2003 | Kreyenborg et al. |
| 6,685,350 B2 | 2/2004 | Esser et al. |
| 6,695,396 B1 | 2/2004 | Schwab |
| 6,860,686 B2 | 3/2005 | Schneider |
| 6,939,029 B1 | 9/2005 | Stahel et al. |
| 6,948,835 B2 | 9/2005 | King et al. |
| 6,997,585 B2 * | 2/2006 | Ito ................................. 362/507 |
| 7,037,027 B2 | 5/2006 | Steinbeck |
| 7,168,835 B2 | 1/2007 | Steinbeck et al. |
| 7,179,036 B2 | 2/2007 | Griffin et al. |
| 7,241,097 B2 | 7/2007 | Dembowsky et al. |
| 7,338,192 B2 | 3/2008 | Kreutzberg |
| 7,682,120 B1 | 3/2010 | Goldbaum |
| 7,748,089 B2 | 7/2010 | Jalbert et al. |
| 7,762,752 B2 | 7/2010 | Kato |
| 8,066,465 B2 | 11/2011 | Figge et al. |
| 8,337,132 B2 * | 12/2012 | Steffenfauseweh et al. .. 411/539 |
| 8,585,266 B2 * | 11/2013 | Kersting et al. ............... 362/523 |
| 2002/0118549 A1 | 8/2002 | Esser et al. |
| 2002/0131843 A1 | 9/2002 | Chen-Chi et al. |
| 2005/0270790 A1 | 12/2005 | Kreutzberg |
| 2009/0067921 A1 | 3/2009 | Ito et al. |
| 2009/0190993 A1 | 7/2009 | De Gelis |
| 2010/0278612 A1 | 11/2010 | Steffenfauseweh et al. |
| 2012/0085630 A1 | 4/2012 | Forsberg et al. |
| 2012/0272506 A1 | 11/2012 | Figge et al. |
| 2013/0017014 A1 | 1/2013 | Wandelt |

FOREIGN PATENT DOCUMENTS

| | | |
|---|---|---|
| DE | 4017701 A1 | 12/1991 |
| DE | 4228889 A1 | 3/1994 |
| DE | 4426785 C1 | 8/1995 |
| DE | 29509925 U1 | 8/1995 |
| DE | 19546703 C1 | 9/1997 |
| DE | 19636029 C1 | 2/1998 |
| DE | 19650864 A1 | 6/1998 |
| DE | 19932660 A1 | 2/2001 |
| DE | 19949654 A1 | 4/2001 |
| DE | 20119112 U1 | 2/2002 |
| DE | 10063649 A1 | 7/2002 |
| DE | 10104906 A1 | 8/2002 |
| DE | 10234225 A1 | 2/2004 |
| DE | 10330921 A1 | 2/2005 |
| DE | 102004005978 A1 | 9/2005 |
| DE | 202004020658 U1 | 10/2005 |
| DE | 202005016544 U1 | 1/2006 |
| DE | 102005030676 A1 | 1/2007 |
| DE | 102005044064 A1 | 3/2007 |
| DE | 102007002699 A1 | 7/2008 |
| DE | 102007028988 A1 | 12/2008 |
| DE | 102009035831 A1 | 9/2010 |
| DE | 102010019926 A1 | 10/2011 |
| DE | 102012009173 A1 | 11/2012 |
| DE | 102011104386 A1 | 12/2012 |
| DE | 1102011104386 A1 | 12/2012 |
| DE | 102012100459 A1 | 7/2013 |
| EP | 0239440 A1 | 9/1987 |
| EP | 0459187 A1 | 12/1991 |
| EP | 0679553 A1 | 11/1995 |
| EP | 0795718 A1 | 9/1997 |
| EP | 1000804 A2 | 5/2000 |
| EP | 1217222 A1 | 6/2002 |
| EP | 1464539 A2 | 10/2004 |
| EP | 1669614 A1 | 6/2006 |
| EP | 1715198 A2 | 10/2006 |
| EP | 2664496 A1 | 11/2013 |
| EP | 2667042 A1 | 11/2013 |
| FR | 2719269 A1 | 11/1995 |
| FR | 2829729 A1 | 3/2003 |
| FR | 2971565 A1 | 8/2012 |
| WO | 9407040 A1 | 3/1994 |
| WO | 03052279 A2 | 6/2003 |

\* cited by examiner

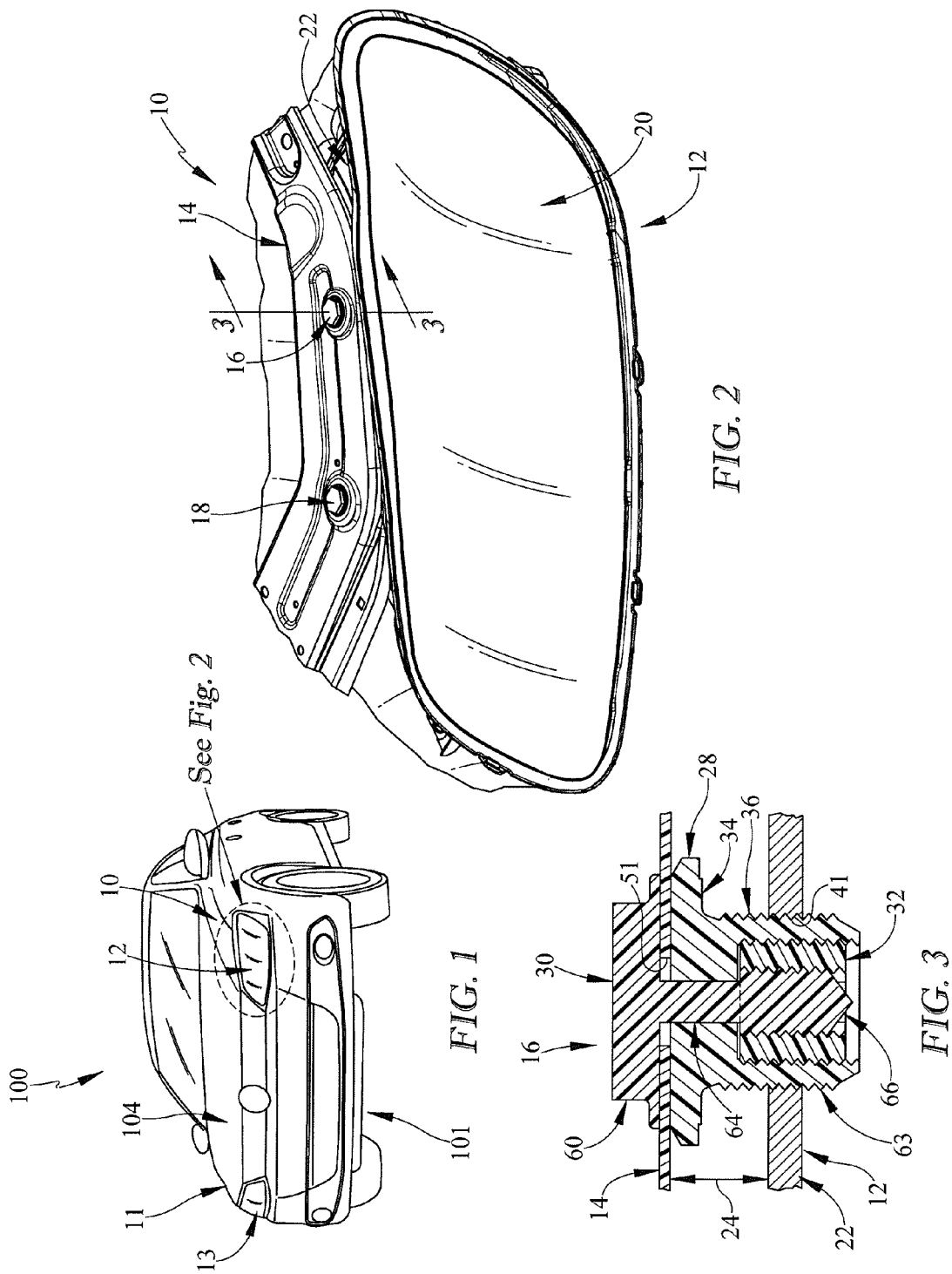

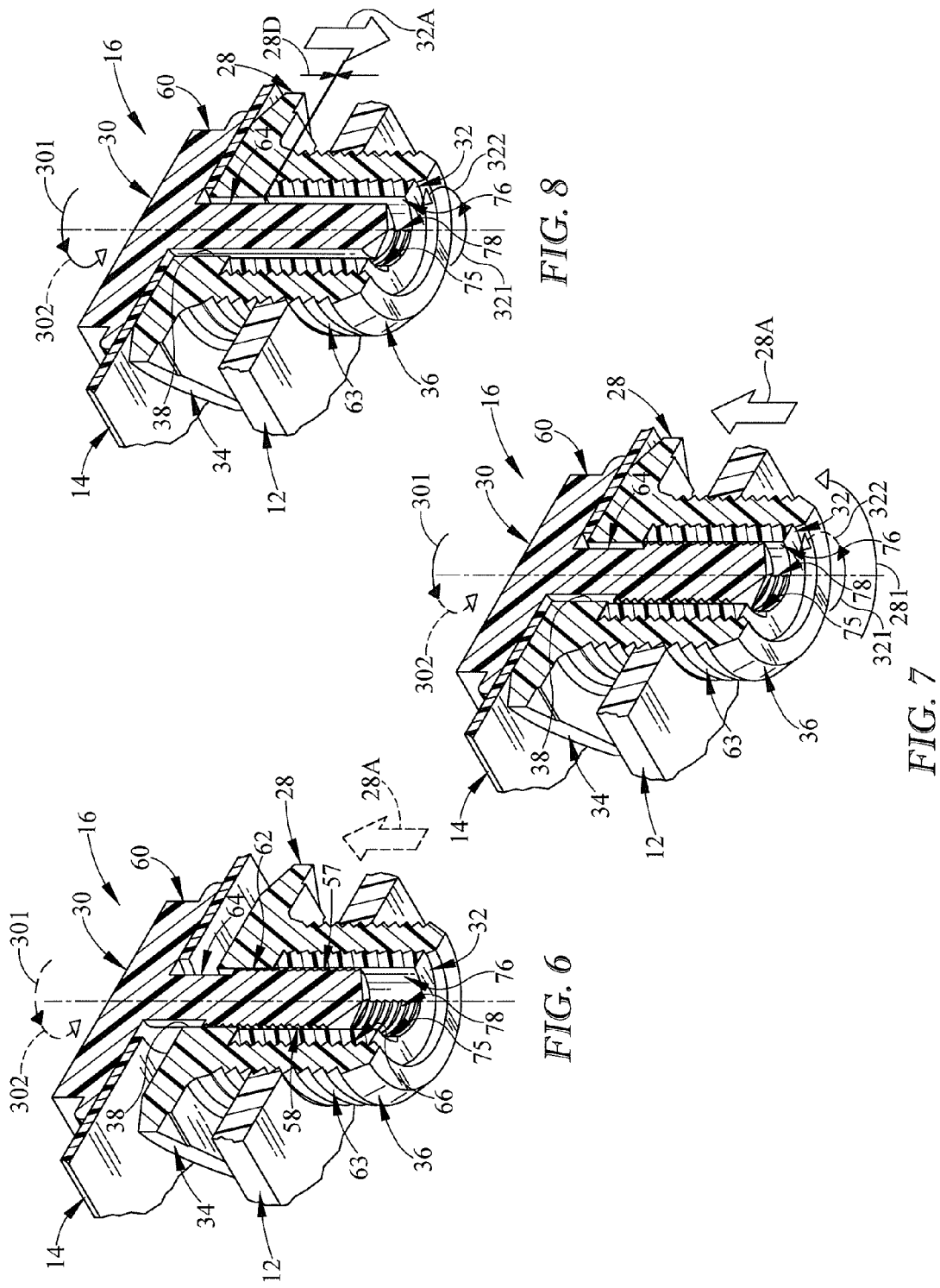

VEHICLE HEADLIGHT ASSEMBLY WITH SELF-ADJUSTING FASTENERS

BACKGROUND

The present disclosure relates to passenger vehicles. More specifically, the present disclosure is directed to headlight assemblies included in passenger vehicles.

SUMMARY

According to the present disclosure, a headlight assembly includes a brace, a headlamp supported by the brace, and a plurality of self-adjusting fasteners that fix the headlamp in place relative to the brace. The self-adjusting fasteners are configured to automatically adjust during assembly to compensate for irregular spacing between the headlamp and the brace caused by allowed variation in manufacturing.

In illustrative embodiments, each self-adjusting fastener includes an anchor, a drive screw, and a bushing. The anchor has a sleeve with external threads engaged with the brace and a cap formed to include an aperture. The drive screw has a head, a shank, and a shoulder extending from the head to the shank. The bushing has external threads engaged with internal threads formed in the sleeve of the anchor and an internal feature engaged with the shank included in the drive screw to couple the drive screw to the bushing.

In illustrative embodiments, the shank of the drive screw is sized to engage the cap of the anchor around the aperture during a first phase of drive-screw rotation so that the anchor is coupled to the drive screw for common rotation when the shank is received in the aperture. The shoulder is sized to extend through the aperture formed in the cap without engaging the cap around the aperture during a second phase of drive-screw rotation so that the drive screw is free to rotate relative to the anchor when the shoulder is received in the aperture.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 1 is perspective view of a passenger vehicle having a pair of headlight assemblies mounted along the front side of a hood included in the passenger vehicle;

FIG. 2 is a perspective view of one of the headlight assemblies shown in FIG. 1 with a portion of the hood broken away to show that the headlight assembly includes a brace, a headlamp, and a plurality of self-adjusting fasteners coupling the headlamp to the brace;

FIG. 3 is a cross-sectional view of a portion of the headlight assembly shown in FIG. 2 taken along Line 3 showing one of the self-adjusting fasteners coupling the headlamp to the brace while taking up a space between the headlamp and the brace to compensate for spacing between the headlamp and the brace caused by manufacturing variations;

FIG. 6 is a cross-sectional view of a portion of the headlight assembly shown in FIGS. 1-3 during assembly of the headlight assembly showing that prior to rotation of the drive screw the bushing is mated via threaded connection with the anchor that is pre-mounted in a hole formed in the headlamp and showing that the drive screw is inserted through the opening formed in the brace and into the anchor and bushing of the receiver;

FIG. 7 is a view similar to FIG. 6 after the drive screw has been rotated through a first phase of installation in which a shank of the drive screw is engaged with a complementary aperture formed in the anchor so that the anchor and bushing rotate with the drive screw showing that rotation of the anchor with the drive screw causes left-hand threads included in the anchor to interact with the hole in the headlamp to move the anchor and bushing of the receiver out of the hole to fill a space between the brace and the headlamp; and FIG. 8 is a view similar to FIGS. 6 and 7 after the drive screw has been rotated through a second phase of installation in which the shank of the drive screw moves out of the aperture formed in the anchor so that the drive screw is free to rotate relative to the anchor and showing that external threads included in the shank of the drive screw then engage and bind up with internal threads included in the bushing to couple the bushing to the drive screw for common rotation so that further rotation of the drive screw causes rotation of the bushing relative to the anchor and the external threads of the bushing and the internal threads of the sleeve included in the anchor interact to move the bushing along the sleeve and secure the self-adjusting fastener in place.

DETAILED DESCRIPTION

Figure 4:
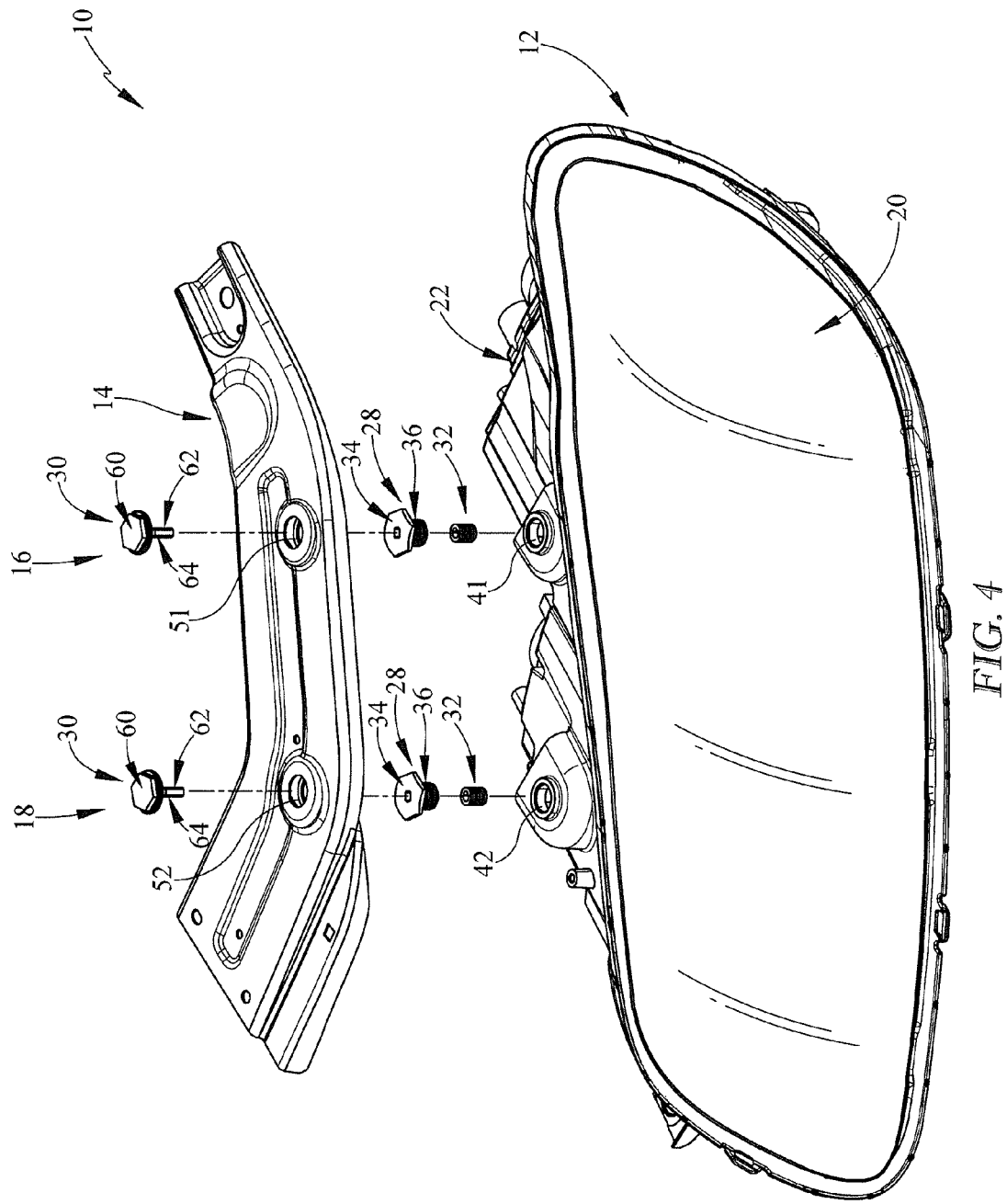
FIG. 4 is an exploded perspective view of the headlight assembly of FIG. 2 showing that the brace is formed to include a plurality of openings arranged to align with a plurality of holes formed in the headlamp and suggesting that the fasteners extend through the openings and the holes to couple the headlamp to the brace.

According to the present disclosure, a passenger vehicle 100 includes headlight assemblies 10, 11 arranged along a front side 101 of the passenger vehicle 100 as shown in FIG. 1. Headlamps 12, 13 included in the headlight assemblies 10, 11, respectively, are mounted in a preselected orientation to properly illuminate the road and other surroundings in front of the passenger vehicle 100. Each headlight assembly 10, 11 is a substantially similar mirror image of the other headlight assembly 10, 11. For this reason, only headlight assembly 10 is further described but the description of headlight assembly 10 applies to headlight assembly 11.

Turning now to FIG. 2, a hood 104 of the passenger vehicle 100 is cut-away to show that the headlight assembly 10 includes a brace 14, the headlamp 12, and self-adjusting fasteners 16, 18. The brace 14 supports the headlamp 12 relative to the rest of the passenger vehicle 100. The headlamp 12 includes a lighting element 20 and a housing 22. The self-adjusting fasteners 16, 18 extend through the brace 14 and into the housing 22 of the headlamp 12 to couple the headlamp 12 to the brace 14.

The self-adjusting fasteners 16, 18 are configured to take up spaces 24 formed between the brace 14 and the headlamp 12 as shown in FIG. 3. The spaces 24 vary in size on account of allowed manufacturing tolerance of the brace 14 and the preselected orientation of the headlamp 12. The self-adjusting fasteners 16, 18 compensate for the irregular spacing between the brace 14 and the headlamp 12 allowing the headlamp 12 to be maintained in the preselected orientation relative to the rest of the passenger vehicle 100 without manual adjustment of the space taken up by the fasteners 16, 18.

Each self-adjusting fastener 16, 18 is substantially similar and includes an anchor 28, a drive screw 30, and a bushing 32 as shown in FIG. 4. The anchor 28 screws into holes 41, 42 formed in the housing 22 of the headlamp 12 to couple the self-adjusting fasteners 16, 18 to the headlamp 12. The drive screw 30 is inserted through openings 51, 52 formed in the braces 14 and into the anchor 28. The bushing 32 is coupled to both the anchor 28 and to the drive screw 30 and secures the self-adjusting fastener in place when mounting of the headlamp 12 is complete.

Figure 5:
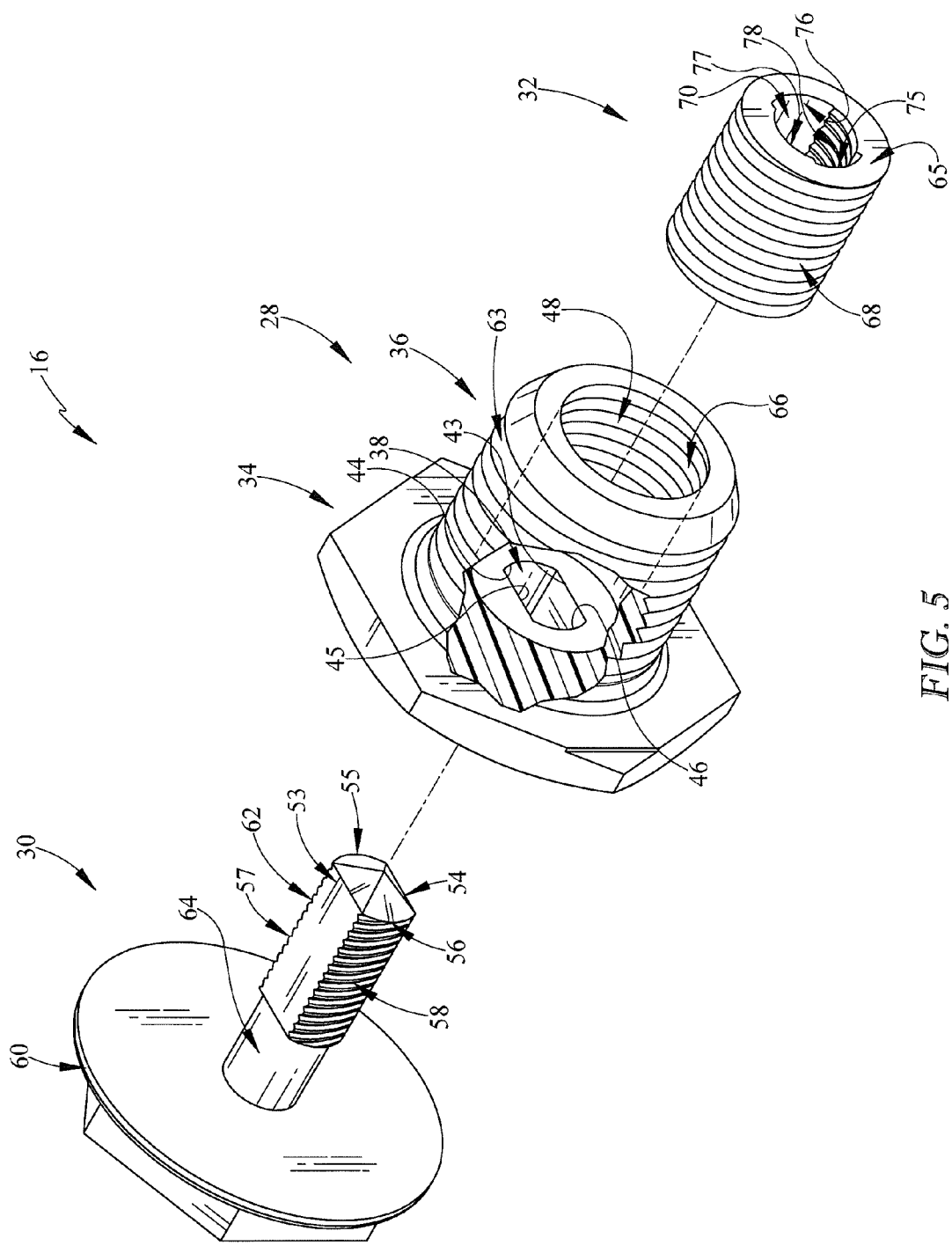
FIG. 5 is an exploded perspective view of one of the self-adjusting fasteners included in FIGS. 2 and 5 showing that each of the self-adjusting fasteners includes (from left to right) a drive screw, an anchor, and a bushing.

The anchor 28 is illustratively made from a plastics material but may be constructed from metallic or nonmetallic materials. The anchor 28 illustratively includes a cap 34 and a sleeve 36 that extends from the cap 34 as shown in FIG. 5. The cap 34 is adapted to be rotated by a wrench when the anchor 28 is screwed into a hole 41, 42 of the headlamp 12 and is formed to include an aperture 38. The aperture 38 opens into a bore 48 of the sleeve 36 and is illustratively defined by two opposing flat sides 43, 45 and two opposing arcuate sides 44, 46. The sleeve 36 illustratively includes exterior left-hand threads 63 that engage the housing 22 of the headlamp 12 and internal right-hand threads 66 that engage the bushing 32.

The drive screw 30 is illustratively made from a metallic material but may be constructed from plastics materials or other nonmetallic materials. The drive screw 30 illustratively includes a head 60, a shank 62, and a shoulder 64 as shown in FIG. 5. The head 60 is adapted to be rotated by a wrench and is sized to engage the brace 14 when inserted through an opening 51, 52 formed in the brace 14. The shank 62 is sized to engage the cap 34 of the anchor 28 around the aperture 38 so that the anchor 28 rotates with the drive screw 30 when the shank 62 is received in the aperture 38. The shoulder 64 extends between the head 60 and the shank 62 and is sized to pass through the aperture 38 without engaging the cap 34 so that the anchor 28 does not rotate with the drive screw 30 when the shoulder is received in the aperture 38.

The shank 62 of the drive screw 30 is illustratively sized to correspond generally with the aperture 38 formed in the cap 34 as shown in FIG. 5. The complementary shapes of the shank 62 and the aperture 38 cause the shank 62 to engage the cap 34 around the aperture 38 so that the anchor 28 including the cap 34 is coupled to the drive screw 30 for common rotation therewith when the shank 62 is received in the aperture 38. In the illustrative embodiment, the shank 62 has two flat opposing sides 53, 54 and two opposing arcuate sides 55, 56. The arcuate sides 55, 56 of the shank 62 are threaded with right-hand threads 57, 58.

The shoulder of 64 of the drive screw 30 illustratively has a smaller cross-section than the shank 62 so that the shoulder passes through the aperture 38 formed in the cap 34 without engaging the cap 34 as suggested in FIG. 5. The shoulder 64 is long enough to pass through the brace 14 and the cap 34 of the anchor 28 so that the shank 62 may be moved out of the aperture 38 formed in the cap 34 when the self-adjusting fasteners 16, 18 is fully installed. When only the shoulder 64 is received in the aperture 38 and the shank 62 is moved out of the aperture 38, the anchor 28 does not rotate with the drive screw 30. In the illustrative embodiment, the shoulder 64 has a round cross-section.

During a first phase of drive screw rotation, the shank 62 of the drive screw 30 is received in the aperture 38 of the anchor 28 and the anchor 28 rotates with the drive screw 30 as suggested by arrows 281 and 301 in FIG. 7. As the anchor 28 rotates with the drive screw 30, the external left-hand threads 63 of the anchor 28 interact with the headlamp 12 to move the anchor 28 relative to the brace 14 as suggested by arrow 28A in FIG. 7. Specifically, as the drive screw 30 is rotated in a clockwise direction (typical for tightening a fastener) as suggested by arrow 301, the external left-hand threads 63 of the anchor 28 move the anchor 28 out of the headlamp 12 and into contact with the brace 14 filling the space 24 between the brace 14 and the headlamp 12.

When a predetermined amount of the drive screw 30 is received in the anchor 28, a second phase of drive screw rotation begins as suggested by arrow 302. During the second phase of drive screw rotation, the shank 62 of the drive screw 30 is moved out of the aperture 38 and the shoulder 64 of the drive screw 30 extends through the aperture 38 so that additional rotation of the drive screw 30 as suggested by arrow 302 does not cause rotation of the anchor 28 as shown in FIG. 8.

The bushing 32 is illustratively made from a plastics material but may be constructed from metallic or nonmetallic materials. The bushing 32 is premounted in the bore 48 formed by the sleeve 36 of the anchor 28 as shown in FIG. 3. The bushing 32 illustratively includes a cylinder 65 with external right-hand threads 68, two internal threaded portions 77, 78 arranged in the bore 70 of the cylinder 65, and two internal unthreaded portions 75, 76 arranged circumferentially between the internal threaded portions 77, 78. The spaced-apart internal threaded portions 77, 78 are sized to bind with the right-hand threads 57, 58 of the drive screw 30 to couple the drive screw 30 to the bushing 32 for common rotation when the threads 57, 58, 77, 78 are engaged. In other embodiments, other internal and external features of the bushing 32 and drive screw 30 may cooperate to couple the bushing 32 to the drive screw 30 for common rotation when the anchor 28 is released from rotation with the drive screw 30.

During the first phase of drive screw rotation, while the shank 62 of the drive screw 30 is received in the aperture 38 so that the drive screw 30 rotates with the anchor 28, the threads 57, 58 of the drive screw 30 are arranged along the internal unthreaded portions 75, 76 of the bushing 32 as shown in FIG. 7. While the threads 57, 58 of the drive screw 30 are arranged along the internal unthreaded portions 75, 76 of the bushing 32, the bushing 32 rotates with the anchor 28 as suggested by arrow 321 in FIG. 7.

During the second phase of drive screw rotation, when the drive screw 30 extends a predetermined distance into the anchor 28 and the shoulder 64 of the drive screw 30 is received in the aperture 38, the threads 57, 58 of the drive screw 30 turn slightly in the bushing 32 to engage the internal threads 77, 78 of the bushing 32 as shown in FIG. 8. When the threads 57, 58, 77, 78 of the drive screw 30 and the bushing 23 are engaged, the bushing 32 is coupled to the drive screw 30 for common rotation. Further rotation of the drive screw 30 as suggested by arrow 302 causes rotation of the bushing 32 relative to the anchor 28 as suggested by arrow 322 shown in FIG. 8. Rotation of the bushing 32 relative to the anchor 30 results in external threads 68 of the bushing 32 interacting with the internal threads 66 of the sleeve 36 included in the anchor 28 to move the bushing 32 along the sleeve 36 as suggested by distance 28D tightening the fastener 16 so that the headlamp 12 is retained in place relative to the brace 14 as suggested by arrow 32A in FIG. 8.

Many passenger vehicles include headlight assemblies having headlamps mounted to braces by fasteners. Some such assemblies rely on specialized adjustable fasteners to compensate for irregular spacing between the components and braces caused by manufacturing tolerances inherent to production. The use of specialized adjustable fasteners to compensate for irregular spacing within an assembly presents technical problems relating to the assembly time required for manually-adjustable fasteners and relating to high-cost associated with some automatically-adjusting fasteners.

Embodiments of the present disclosure provide a solution to the technical problems that manually-adjustable fasteners require long assembly times and that some automatically-adjustable fasteners are expensive to procure. Specifically, the present disclosure provides self-adjusting fasteners adapted to compensate for irregular spacing between headlamps and braces to which the headlamps are mounted so that the headlamps may be set at a preselected orientation to properly illuminate surroundings of a passenger vehicle without requiring manual adjustment of the fastener.

The self-adjusting fasteners of the present disclosure are also suitable for use in other vehicle assemblies in which spaces are present between a vehicle component and the bracket to which the vehicle component is mounted. For example, taillight assemblies, trim assemblies, and other various vehicle assemblies may include the self-adjusting fasteners disclosed herein.

Although certain illustrative embodiments have been described in detail above, variations and modifications exist within the scope and spirit of this disclosure as described and as defined in the claims included in this application.

The invention claimed is:

1. A headlight assembly comprising
a brace formed to include a plurality of openings,
a headlamp including a lighting element and a housing, the housing formed to include a plurality of holes arranged to align with the plurality of openings included in the brace, and
a plurality of self-adjusting fasteners extending through the openings in the brace and into the holes in the headlamp to couple the headlamp to the brace, the plurality of self-adjusting fasteners configured to self-adjust during mounting of the headlamp so that the headlamp is maintained in a preselected orientation while compensating for irregular spacing between the headlamp and the brace caused by manufacturing variations, each self-adjusting fastener including (i) an anchor having a sleeve with external threads engaged with the brace around the hole and a cap formed to include an aperture, (ii) a drive screw having a head sized to engage the brace around the aperture, a shank, and a shoulder extending from the head to the shank, and (iii) a bushing having external threads engaged with internal threads of the sleeve included in the anchor and an internal feature engaged with the shank included in the drive screw to couple the drive screw to the bushing,
wherein the shank of the drive screw is sized to engage the cap of the anchor around the aperture during a first phase of drive-screw rotation so that the anchor is coupled to the drive screw for common rotation when the shank is received in the aperture and the shoulder is sized to extend through the aperture formed in the cap without engaging the cap around the aperture during a second phase of drive-screw rotation so that the drive screw is free to rotate relative to the anchor when the shoulder is received in the aperture.

2. The headlight assembly of claim 1, wherein the external threads of the sleeve included in the anchor are left-hand threads and the internal threads of the sleeve included in the anchor are right-hand threads.

3. The headlight assembly of claim 2, wherein the external threads of the bushing engaged with the internal threads of the sleeve are right-hand threads.

4. The headlight assembly of claim 1, wherein aperture formed in the cap of the anchor has an elongated shape.

5. The headlight assembly of claim 4, wherein the shank of the drive screw is elongated to mate with the aperture and has two flat opposing sides and two opposing threaded sides.

6. The headlight assembly of claim 5, wherein the shoulder of the drive screw is unthreaded.

7. The headlight assembly of claim 1, wherein internal feature of the bushing is configured to couple the drive screw to the bushing for common rotation therewith when the shank of the drive screw extends a predetermined distance into a bore of the bushing.

8. The headlight assembly of claim 7, wherein the internal feature of the bushing is arranged to couple the drive screw to the bushing for common rotation when the shoulder of the drive screw is received in the aperture of the cap so that further rotation of the drive screw causes rotation of the bushing relative to the anchor and the external threads of the bushing and the internal threads of the sleeve included in the anchor interact to move the bushing along the sleeve.

9. The headlight assembly of claim 7, werein the internal feature is an internal thread sized to bind with external threads included in the shank of the drive screw.

10. The headlight assembly of claim 7, wherein the shank of the drive screw has two flat opposing sides and two opposing threaded sides and the internal feature of the bushing includes two circumferentially spaced-apart internal threads configured to bind with the two opposing threaded sides included in the shank of the drive screw.

11. A vehicle assembly comprising
a brace formed to include an opening,
a component adapted to be mounted to the brace and formed to include a hole arranged to align with the opening included in the brace, and
a self-adjusting fastener configured extend through the opening and the hole to couple the component to the brace so that the component is maintained in a preselected orientation while compensating for space between the component and the brace, the self-adjusting fastener including (i) an anchor having a cap formed to include an aperture and a sleeve with external threads engaged with the brace around the hole, (ii) a drive screw having a head sized to engage the brace around the aperture, a shank sized to engage the cap of the anchor around the aperture so that the anchor is coupled to the drive screw for common rotation when the shank is received in the aperture, and a shoulder extending from the head to the shank and sized to extend through the aperture formed in the cap without engaging the cap around the aperture so that the drive screw is free to rotate relative to the anchor when the shoulder is received in the aperture, and (iii) a bushing engaged with the drive screw to retain the drive screw relative to the anchor.

12. The vehicle assembly of claim 11, wherein the external threads of the sleeve included in the achor are left-hand threads and the internal threads included in the sleeve of the anchor are right-hand threads.

13. The vehicle assembly of claim 12, wherein the bushing includes external right-hand threads engaged with the internal threads included in the sleeve of the anchor.

14. The vehicle assembly of claim 11, wherein aperture formed in the cap of the anchor has an elongated shape.

15. The vehicle assembly of claim 14, wherein the shank of the drive screw is elongated to mate with the aperture and has two flat opposing sides and two opposing threaded sides.

16. The vehicle assembly of claim 15, wherein the shoulder of the drive screw is unthreaded.

17. The vehicle assembly of claim 11, wherein the bushing includes an internal feature configured to couple the drive screw to the bushing for common rotation therewith when the shank of the drive screw extends a predetermined distance into a bore of the bushing.

18. The vehicle assembly of claim 17, wherein the internal feature of the bushing is arranged to couple the drive screw to the bushing for common rotation when the shoulder of the drive screw is received in the aperture of the cap so that further rotation of the drive screw causes rotation of the bushing relative to the anchor and the external threads of the bushing and the internal threads of the sleeve included in the anchor interact to move the bushing along the sleeve.

19. The vehicle assembly of claim 17, werein the internal feature is an internal thread sized to bind with external threads included in the shank of the drive screw.

20. The vehicle assembly of claim 17, wherein the shank of the drive screw has two flat opposing sides and two opposing threaded sides and the internal feature of the bushing includes two circumferentially spaced-apart internal threads configured to bind with the two opposing threaded sides included in the shank of the drive screw.

21. A self-adjusting fastener comprising
an anchor having a cap formed to include an aperture and a sleeve that extends from the cap, the sleeve including external left-hand threads and internal right-hand threads,
a drive screw having a head, a shank sized to engage the cap of the anchor around the aperture so that the anchor is coupled to the drive screw for common rotation when the shank is received in the aperture, and a shoulder extending from the head to the shank and sized to extend through the aperture formed in the cap without engaging the cap around the aperture so that the drive screw is free to rotate relative to the anchor when the shoulder is received in the aperture, and
a bushing including external right-hand threads engaged with the internal right-hand threads included in the sleeve of the anchor and an internal feature configured to couple the drive screw to the bushing for common rotation therewith when the shoulder of the drive screw is received in the aperture of the cap so that further rotation of the drive screw causes rotation of the bushing relative to the anchor and the external threads of the bushing and the internal threads of the sleeve included in the anchor interact to move the bushing along the sleeve.

22. The self-adjusting fastener of claim 21, werein the internal feature is an internal thread sized to bind with external threads included in the shank of the drive screw.

23. The self-adjusting fastener of claim 21, wherein the shank of the drive screw has two unthreaded opposing sides and two opposing threaded sides and the internal feature of the bushing includes two circumferentially spaced-apart internal threads configured to bind with the two opposing threaded sides included in the shank of the drive screw.

24. The self-adjusting fastener of claim 21, wherein the shank of the drive screw has two flat opposing sides and two opposing arcuate sides formed to include threads.

25. The self-adjusting fastener of claim 24, wherein aperture formed in the cap of the anchor is defined by two opposing flat sides and two opposing arcuate sides.

26. The self-adjusting fastener of claim 21, wherein the shoulder of the drive screw is unthreaded.

27. The self-adjusting fastener of claim 21, wherein the sleeve and the bushing are both cylindrical.

* * * * *